United States Patent
Hu et al.

(10) Patent No.: US 9,627,956 B2
(45) Date of Patent: Apr. 18, 2017

(54) RIDE-THROUGH AND RECOVERY METHOD FOR DC SHORT CIRCUIT FAULTS OF HYBRID MMC-BASED HVDC SYSTEM

(71) Applicant: Huazhong University of Science and Technology, Wuhan (CN)

(72) Inventors: Jiabing Hu, Wuhan (CN); Kecheng Xu, Wuhan (CN); Maozeng Lu, Wuhan (CN); Wanning Zheng, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 65 days.

(21) Appl. No.: 14/621,368

(22) Filed: Feb. 12, 2015

(65) Prior Publication Data

US 2016/0094117 A1 Mar. 31, 2016

(30) Foreign Application Priority Data

Sep. 29, 2014 (CN) .......................... 2014 1 0520904

(51) Int. Cl.
*H02M 1/32* (2007.01)
*H02M 7/483* (2007.01)

(52) U.S. Cl.
CPC ........ *H02M 1/32* (2013.01); *H02M 2001/325* (2013.01); *H02M 2007/4835* (2013.01)

(58) Field of Classification Search
CPC ............ H02M 1/32; H02M 2001/325; H02M 2007/4835; Y02E 60/60
See application file for complete search history.

(56) References Cited

U.S. PATENT DOCUMENTS

| 8,030,791 B2 * | 10/2011 | Lang .................... H02M 5/4505 290/43 |
| 8,743,514 B2 * | 6/2014 | Sihler ....................... H02J 3/36 361/54 |
| 2013/0181531 A1 * | 7/2013 | Deboy .................... H02J 3/385 307/82 |
| 2014/0084835 A1 * | 3/2014 | Kadowaki ............... H02M 1/32 318/479 |
| 2014/0160802 A1 * | 6/2014 | Zhang ................... H02M 3/335 363/21.01 |

* cited by examiner

*Primary Examiner* — Jessica Han
*Assistant Examiner* — Demetries A Gibson
(74) *Attorney, Agent, or Firm* — Matthias Scholl, PC; Matthias Scholl

(57) ABSTRACT

A ride-through and recovery method for DC short circuit faults of a hybrid modular multilevel converter based high-voltage direct current transmission (MMC-HVDC) system, the hybrid MMC including multiple full-bridge sub-modules and half-bridge sub-modules, and the method including: 1) detecting whether a DC short circuit fault occurs, and proceeding to step (2) if yes and continuing detecting if no; 2) realizing ride-through of the DC short circuit fault; 3) detecting whether a DC residual voltage increases, and proceeding to step (4) if yes and continuing detecting if no; and 4) realizing DC short circuit fault recovery.

5 Claims, 11 Drawing Sheets

RIDE-THROUGH AND RECOVERY METHOD FOR DC SHORT CIRCUIT FAULTS OF HYBRID MMC-BASED HVDC SYSTEM

CROSS-REFERENCE TO RELATED APPLICATIONS

Pursuant to 35 U.S.C. §119 and the Paris Convention Treaty, this application claims the benefit of Chinese Patent Application No. 201410520904.7 filed Sep. 29, 2014, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of multilevel power electronic converters, and more particularly to a ride-through and recovery method for DC short circuit faults of a hybrid MMC-based HVDC system.

Description of the Related Art

Modular multilevel converter based high-voltage direct current transmission (MMC-HVDC) system plays an important role in flexible DC transmission for its advantages in system loss, capacity upgrade, electromagnetic compatibility, fault management, etc. However, DC fault is a serious fault type which should be considered in design and operation not only for an offshore MMC-HVDC project using submarine cables, but also for an onshore MMC-HVDC project using overhead lines, and the probability of DC faults is much higher for the latter than it is for the former.

At present, DC faults are processed mainly in the following three ways:

1) Disconnecting an AC system by a device on the AC system side (such as an AC circuit breaker or an AC fuse) which is mostly used in an MMC-HVDC system formed by half-bridge sub-modules. When a DC fault occurs, anti-parallel freewheeling diodes of full-controlled devices in an MMC formed by half-bridge sub-modules connect the AC system to the DC fault point, which means short-circuit of the AC system, and the connection should be disconnected. However, the method features slow response speed, complex timing of restart coordinating actions, and comparatively long system recovery time, and has a great impact on the AC system.

2) Isolating the DC fault by blocking the converters, which is mostly used in an MMC-HVDC system formed by full-bridge sub-modules or by clamping double sub-modules. However, the restart process is slow and complicated, DC fault recovery cannot be realized solely by a converter, non-permanent short circuit faults reoccurring when overhead lines are used as transmission lines cannot be handled, reactive power support cannot be provided for an AC system during failure and active power cannot be transmitted in recovery, stability of a connected AC system is decreased by a suddenly blocking of a converter in failure, and an MMC-HVDC system formed by full-bridge sub-modules or by clamping double sub-modules costs high and an operation loss thereof is large.

3) Isolating a DC fault point by a device on a DC side (such as a DC circuit breaker), a DC circuit breaker features difficult are extinction and line energy dissipation, high production cost, and immature technology, and is rarely used in high-voltage and large-capacity situations.

Although the above three methods may protect a converter station, all of them cannot ensure security of a connected AC system and cannot give support to DC fault recovery.

SUMMARY OF THE INVENTION

In view of the above-mentioned problems, it is an objective of the invention to provide a ride-through and recovery method for DC short circuit faults of a hybrid MMC-based HVDC system, which features fast fault response and recovery, can isolate a DC fault while providing reactive and active power support for an AC system and a DC system, and can improve transient stability of a connected AC system and a connected DC system.

To achieve the above objective, there is provided a ride-through and recovery method for DC short circuit faults of a hybrid MMC-based HVDC system. The hybrid MMC is formed by full-bridge sub-modules and half-bridge sub-modules, and the method comprises:

1) detecting whether a DC short circuit fault occurs, and proceeding to step (2) if yes and continuing detecting if no;

2) realizing ride-through of the DC short circuit fault by performing following steps A) and B) sequentially;

3) detecting whether a DC residual voltage increases, and proceeding to step (4) if yes and continuing detecting if no; and 4) realizing DC short circuit fault recovery by performing step A) and step B) sequentially.

step A) is as follows: detecting the DC residual voltage, a three phase AC voltage, and a three phase AC current, combining with a reactive power required to be injected to a grid by the MMC during failure and an active power required to be transmitted by DC lines, and obtaining an AC voltage reference required to be output for each phase of the MMC during ride-through of the DC short circuit fault.

step B) is as follows: calculating a voltage reference $u_{if\_p}$ of full-bridge sub-modules' equivalent voltage source and a voltage reference $u_{ih\_p}$ of half-bridge sub-modules' equivalent voltage source in an upper arm of each phase, and calculating a voltage reference $u_{if\_n}$ of full-bridge sub-modules' equivalent voltage source and a voltage reference $u_{ih\_n}$ of half-bridge sub-modules' equivalent voltage source in a lower arm of each phase, according to the AC voltage reference $e_{iv\_ref}$ required to be output for each phase of the MMC during ride-through of the DC short circuit fault, and obtaining a switching signal for each of the sub-modules by combining with a present voltage of each of the sub-modules, where the subscript i equals a, b, or c, each of which represents a phase.

In a class of this embodiment, in step B), $u_{if\_p}$, $u_{ih\_p}$, $u_{if\_n}$, and $u_{ih\_n}$ are expressed by the following equations:

$$u_{if\_p} = -e_{iv\_ref}(1-\tfrac{1}{2}m) + U_{dc}\tfrac{1}{4}m,$$

$$u_{ih\_p} = -e_{iv\_ref}\tfrac{1}{2}m + U_{dc}\tfrac{1}{4}m,$$

$$u_{if\_n} = e_{iv\_ref}(1-\tfrac{1}{2}m) + U_{dc}\tfrac{1}{4}m, \text{ and}$$

$$u_{ih\_n} = e_{iv\_ref}\tfrac{1}{2}m + U_{dc}\tfrac{1}{4}m;$$

where m represents a ratio of the DC residual voltage and a DC rated voltage, and $U_{dc}$ represents the DC rated voltage.

In a class of this embodiment, in step B), $u_{if\_p}$, $u_{ih\_p}$, $u_{if\_n}$, and $u_{ih\_n}$ are expressed by the following equations:

$$u_{if\_p} = -\tfrac{1}{2}e_{iv\_ref} - \tfrac{1}{4}U_{dc} + \tfrac{1}{2}mU_{dc},$$

$$u_{ih\_p} = -\tfrac{1}{2}e_{iv\_ref} + \tfrac{1}{4}U_{dc},$$

$u_{if\_n} = \frac{1}{2}e_{iv\_ref} - \frac{1}{4}U_{dc} + \frac{1}{2}mU_{dc}$, and $u_{ih\_n} = \frac{1}{2}e_{iv\_ref} + \frac{1}{4}U_{dc}$;

where m represents a ratio of the DC residual voltage and a DC rated voltage, and $U_{dc}$ represents the DC rated voltage.

In a class of this embodiment, in step B), $u_{if\_p}$, $u_{ih\_p}$, $u_{if\_n}$, and $u_{ih\_n}$ are expressed by the following equations:

$$u_{if\_p} = -e_{iv\_ref}\left(1 - x - \frac{1}{2}m + xm\right) + U_{dc}\left(\frac{1}{4}m + \frac{xm}{2} - \frac{x}{2}\right),$$

$$u_{ih\_p} = -e_{iv\_ref}\left(x + \frac{1}{2}m - xm\right) + U_{dc}\left(\frac{1}{4}m - \frac{xm}{2} + \frac{x}{2}\right),$$

$$u_{if\_n} = e_{iv\_ref}\left(1 - x - \frac{1}{2}m + xm\right) + U_{dc}\left(\frac{1}{4}m + \frac{xm}{2} - \frac{x}{2}\right),$$

and $$u_{ih\_n} = e_{iv\_ref}\left(x + \frac{1}{2}m - xm\right) + U_{dc}\left(\frac{1}{4}m - \frac{xm}{2} + \frac{x}{2}\right);$$

where x is a constant in the range of 0~0.5, m represents a ratio of the DC residual voltage and a DC rated voltage, and $U_{dc}$ represents the DC rated voltage.

In a class of this embodiment, in step B), when $e_{iv\_ref} \geq 0$, $u_{if\_p}$, $u_{ih\_p}$, $u_{if\_n}$, and $u_{ih\_n}$ are expressed by the following equations:

$u_{if\_p} = -e_{iv\_ref} + \frac{1}{2}me_{iv\_ref} + \frac{1}{4}mU_{dc}$, $u_{ih\_p} = -\frac{1}{2}me_{iv\_ref} + \frac{1}{4}mU_{dc}$, $u_{if\_n} = me_{iv\_ref} + \frac{1}{4}mU_{dc}$, and $u_{ih\_n} = e_{iv\_ref} - \frac{1}{2}me_{iv\_ref} + \frac{1}{4}U_{dc}$;

and when $e_{iv\_ref} < 0$, $u_{if\_p}$, $u_{ih\_p}$, $u_{if\_n}$, and $u_{ih\_n}$ are expressed by the following equations:

$u_{if\_p} = -\frac{1}{2}me_{iv\_ref} + \frac{1}{4}mU_{dc}$, $u_{ih\_p} = -e_{iv\_ref} + \frac{1}{2}me_{iv\_ref} + \frac{1}{4}mU_{dc}$, $u_{if\_n} = e_{iv\_ref} - \frac{1}{2}me_{iv\_ref} + \frac{1}{4}mU_{dc}$, and $u_{ih\_n} = \frac{1}{2}me_{iv\_ref} + \frac{1}{4}mU_{dc}$;

where m represents a ratio of the DC residual voltage and a DC rated voltage, and $U_{dc}$ represents the DC rated voltage.

Advantages of the invention according to embodiments of the invention are as follows:

DC short circuit fault ride-through and recovery by self-control of a converter are realized in the absence of an action of mechanical devices or blocking the converter, and restart of the converter is not required in recovery, which results in fast fault response and recovery, excellent performance especially for non-permanent short circuit faults reoccurring when overhead lines are used as transmission lines, capability of providing reactive and active power support for an AC system and a DC system while isolating DC faults, and benefits for improving transient stability of a connected AC system and a connected DC system.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a ride-through and recovery method for DC short circuit faults of a hybrid MMC-based HVDC system are described below. It should be noted that the following examples are intended to describe and not to limit the invention.

Figure 1:
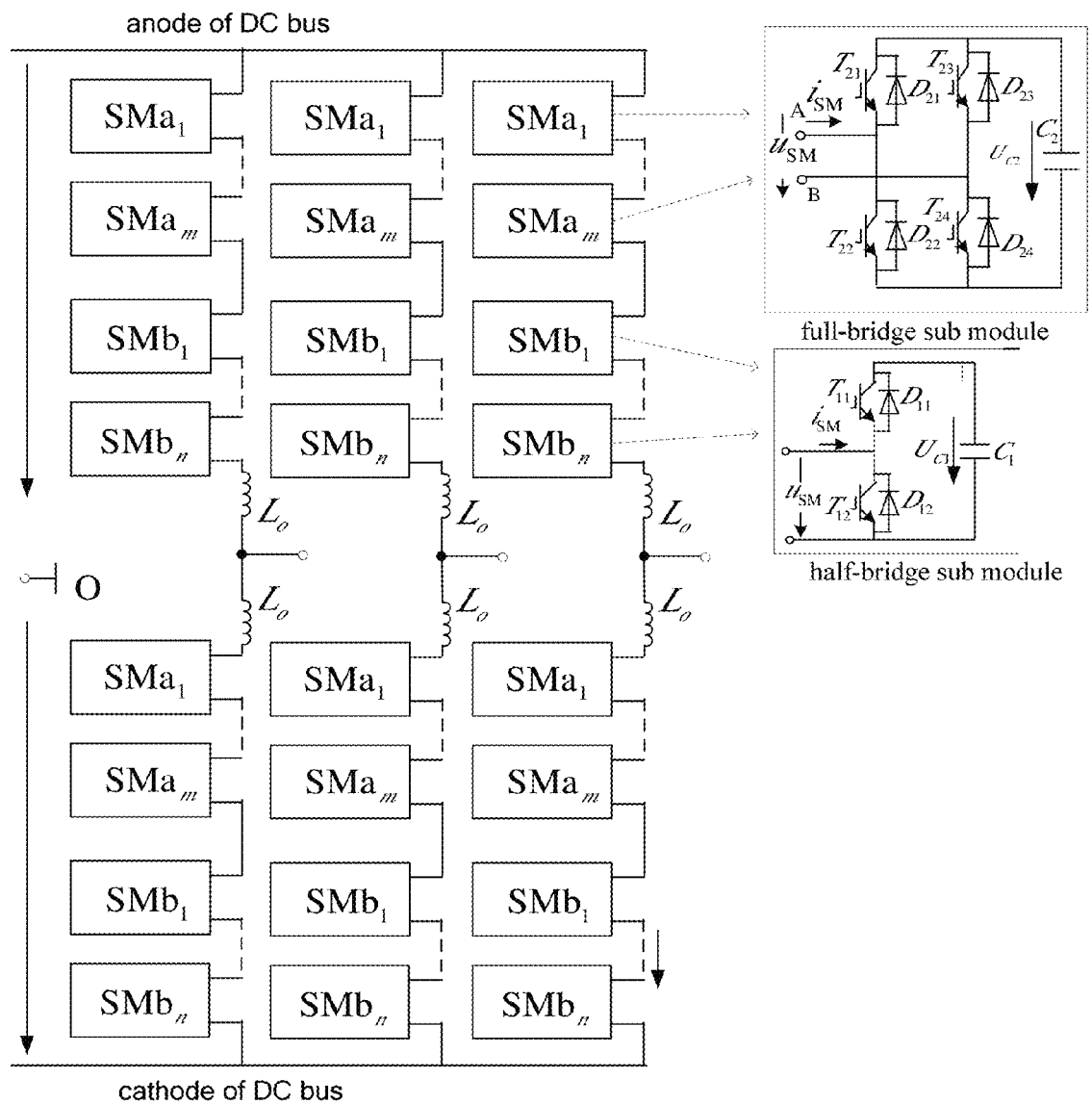
FIG. 1 is a schematic diagram of a hybrid MMC formed by full-bridge sub-modules and half-bridge sub-modules.

An arm of each phase of a hybrid MMC is formed by two kinds of sub-modules, which are labeled as a first sub-module and a second sub-module respectively. The first sub-module can output a positive voltage or a zero voltage, and the second sub-module can output a positive voltage, a negative voltage, or a zero voltage. For example, for the hybrid MMC shown in FIG. 1, the first sub-module is a full bridge sub-module, and the second sub-module is a half bridge sub-module.

Figure 2:
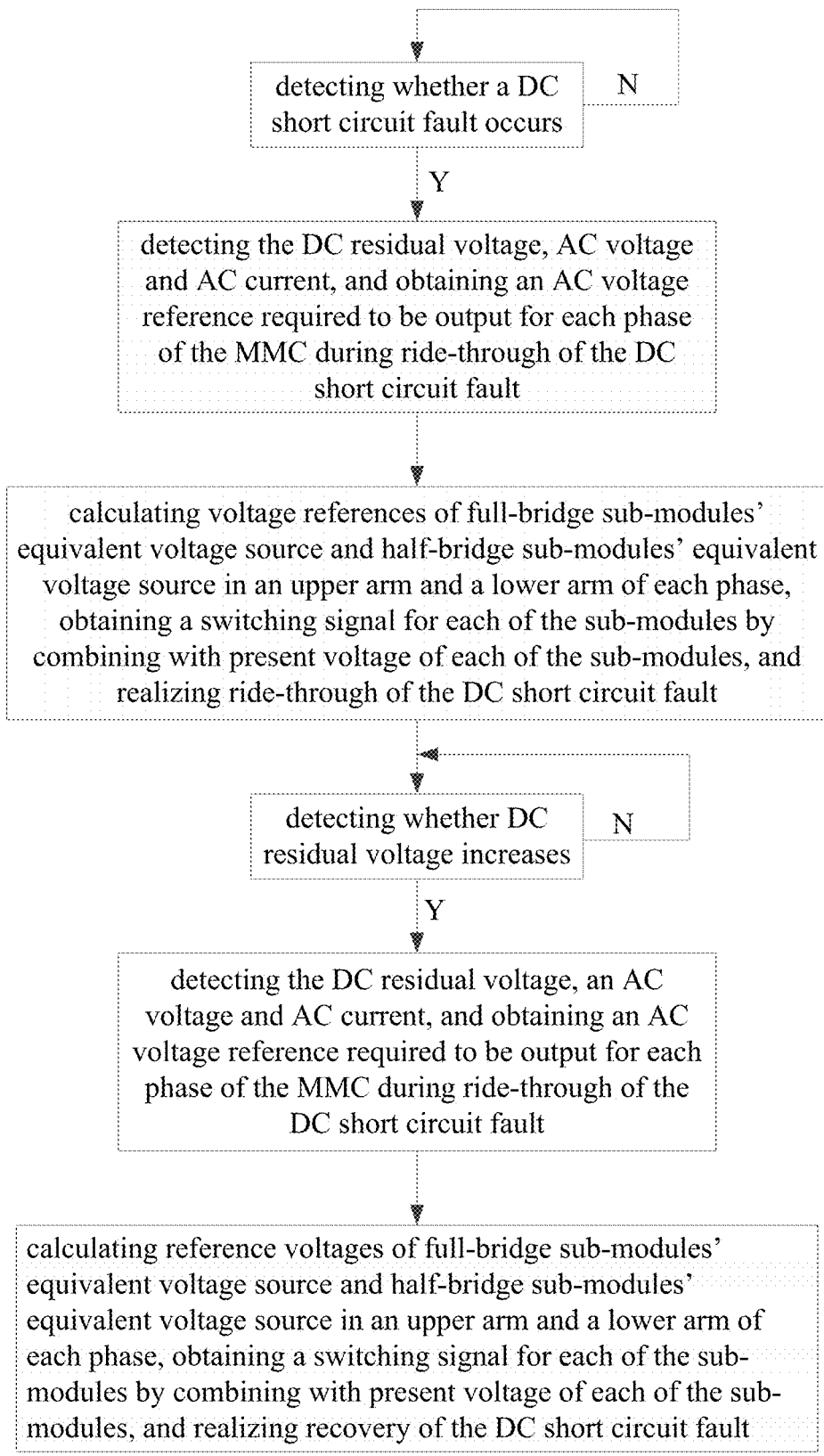
FIG. 2 illustrates a flow chart of a ride-through and recovery method for DC short circuit faults of a hybrid MMC-based HVDC system according to one embodiment of the invention.
Figure 3:
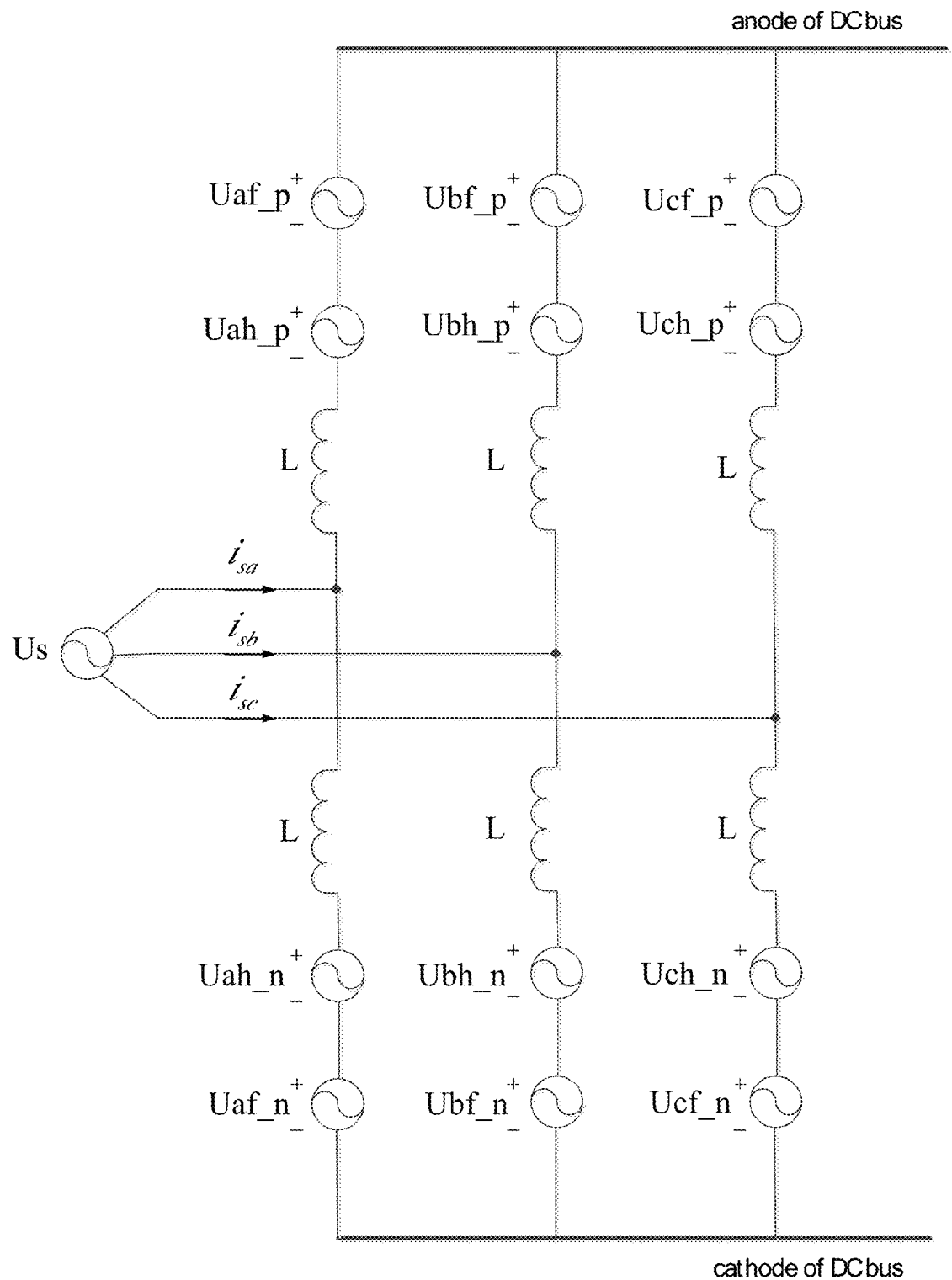
FIG. 3 is a schematic diagram of a hybrid MMC with full-bridge sub-modules and half-bridge sub-modules in an upper arm and an lower arm of each phase equivalent to voltage sources.

In a ride-through and recovery method for DC short circuit faults of a hybrid MMC-based HVDC system according to one embodiment of the invention, the hybrid MMC is formed by full bridge sub-modules and half-bridge sub-modules. As shown in FIG. 2, the method comprises:

1) detecting whether a DC short circuit fault occurs, and proceeding to step (2) if yes and continuing detecting if no;

2) realizing ride-through of the DC short circuit fault by performing following steps A) and B) sequentially;

step A) is as follows: detecting the DC residual voltage, a three phase AC voltage, and a three phase AC current, combining with a reactive power required to be injected to a grid by the MMC during failure and an active power required to be transmitted by DC lines, and obtaining an AC voltage reference required to be output for each phase of the MMC during ride-through of the DC short circuit fault; and step B) is as follows: calculating a voltage reference $u_{if\_p}$ of full-bridge sub-modules' equivalent voltage source and a voltage reference $u_{ih\_p}$ of half-bridge sub-modules' equivalent voltage source in an upper arm of each phase, and calculating a voltage reference $u_{if\_n}$ of full-bridge sub-modules' equivalent voltage source and a voltage reference $u_{ih\_n}$ of half-bridge sub-modules' equivalent voltage source in a lower arm of each phase, according to the AC voltage reference $e_{iv\_ref}$ required to be output for each phase of the MMC during ride-through of the DC short circuit fault, and obtaining a switching signal for each of the sub-modules by combining with a present voltage of each of the sub-modules; the subscript i equals a, b, or c, each of which represents a phase;

3) detecting whether a DC residual voltage increases, and proceeding to step (4) if yes and continuing detecting if no; and 4) realizing DC short circuit fault recovery by performing the above step A) and step B) sequentially.

According to Example 1 of the invention, $u_{if\_p}$, $u_{ih\_p}$, $u_{if\_n}$, and $u_{ih\_n}$ are expressed by the following equations:

$$u_{if\_p} = -e_{iv\_ref}(1-\tfrac{1}{2}m) + U_{dc}\tfrac{1}{4}m,$$

$$u_{ih\_p} = -e_{iv\_ref}\tfrac{1}{2}m + U_{dc}\tfrac{1}{4}m,$$

$$u_{if\_n} = e_{iv\_ref}(1-\tfrac{1}{2}m) + U_{dc}\tfrac{1}{4}m, \text{ and}$$

$$u_{ih\_n} = e_{iv\_ref}\tfrac{1}{2}m + U_{dc}\tfrac{1}{4}m;$$

where m represents a ratio of the DC residual voltage and a DC rated voltage, and $U_{dc}$ represents the DC rated voltage.

According to Example 2 of the invention, $u_{if\_p}$, $u_{ih\_p}$, $u_{if\_n}$, and $u_{ih\_n}$ are expressed by the following equations:

$$u_{if\_p} = -\tfrac{1}{2}e_{iv\_ref} - \tfrac{1}{4}U_{dc} + \tfrac{1}{2}mU_{dc},$$

$$u_{ih\_p} = -\tfrac{1}{2}e_{iv\_ref} + \tfrac{1}{4}U_{dc},$$

$$u_{if\_n} = \tfrac{1}{2}e_{iv\_ref} - \tfrac{1}{4}U_{dc} + \tfrac{1}{2}mU_{dc}, \text{ and}$$

$$u_{ih\_n} = \tfrac{1}{2}e_{iv\_ref} + \tfrac{1}{4}U_{dc};$$

where m represents a ratio of the DC residual voltage and the DC rated voltage, and $U_{cc}$ represents the DC rated voltage.

According to Example 3 of the invention, $u_{if\_p}$, $u_{ih\_p}$, $u_{if\_n}$, and $u_{ih\_n}$ are expressed by the following equations:

$$u_{if\_p} = -e_{iv\_ref}\left(1 - x - \tfrac{1}{2}m + xm\right) + U_{dc}\left(\tfrac{1}{4}m + \tfrac{xm}{2} - \tfrac{x}{2}\right),$$

$$u_{ih\_p} = -e_{iv\_ref}\left(x + \tfrac{1}{2}m - xm\right) + U_{dc}\left(\tfrac{1}{4}m - \tfrac{xm}{2} + \tfrac{x}{2}\right),$$

$$u_{if\_n} = e_{iv\_ref}\left(1 - x - \tfrac{1}{2}m + xm\right) + U_{dc}\left(\tfrac{1}{4}m + \tfrac{xm}{2} - \tfrac{x}{2}\right),$$

and $$u_{ih\_n} = e_{iv\_ref}\left(x + \tfrac{1}{2}m - xm\right) + U_{dc}\left(\tfrac{1}{4}m - \tfrac{xm}{2} + \tfrac{x}{2}\right);$$

where x is a constant in the range of 0~0.5, m represents a ratio of the DC residual voltage and the DC rated voltage, and $U_{Cc}$ represents the DC rated voltage.

According to Example 4 of the invention, when $e_{iv\_ref} \geq 0$, $u_{if\_p}$, $u_{ih\_p}$, $u_{if\_n}$, and $u_{if\_n}$ are expressed by the following equations:

$$u_{if\_p} = -e_{iv\_ref} + \tfrac{1}{2}me_{iv\_ref} + \tfrac{1}{4}mU_{dc},$$

$$u_{ih\_p} = -\tfrac{1}{2}me_{iv\_ref} + \tfrac{1}{4}mU_{dc},$$

$$u_{if\_n} = \tfrac{1}{2}me_{iv\_ref} + \tfrac{1}{4}mU_{dc}, \text{ and}$$

$$u_{ih\_n} = e_{iv\_ref} - \tfrac{1}{2}me_{iv\_ref} + \tfrac{1}{4}U_{dc};$$

and when $e_{iv\_ref} < 0$, $u_{if\_p}$, $u_{ih\_p}$, $u_{if\_n}$, and $u_{ih\_n}$ are expressed by the following equations:

$$u_{if\_p} = -\tfrac{1}{2}me_{iv\_ref} + \tfrac{1}{4}mU_{dc},$$

$$u_{ih\_p} = -e_{iv\_ref} + \tfrac{1}{2}me_{iv\_ref} + \tfrac{1}{4}U_{dc},$$

$$u_{if\_n} = e_{iv\_ref} - \tfrac{1}{2}me_{iv\_ref} + \tfrac{1}{4}mU_{dc}, \text{ and}$$

$$u_{ih\_n} = \tfrac{1}{2}me_{iv\_ref} + \tfrac{1}{4}U_{dc};$$

where m represents a ratio of the DC residual voltage and the DC rated voltage, and $U_{cc}$ represents the DC rated voltage.

The ride-through and recovery method for DC short circuit faults of a hybrid MMC-based HVDC system of the invention is further illustrated in combination with embodiments for better understanding of the invention for skilled persons in the art.

In the following examples, in an upper arm or a lower arm of each phase, ratio of the number of full-bridge sub-modules and that of half-bridge sub-modules is 1:1, each of which equals 5, ratio of capacitor voltage of a full bridge sub-module and that of a half bridge sub-module is 1:1, each of which equals 2 kV, and DC rated voltage $U_{dc}=20$ kV, the transmitted active power equals 10 mW, and the reactive power equals 1 mVAR when a hybrid MMC-based HVDC system is in normal operation.

Example 1

A DC short circuit fault is detected and a DC voltage becomes 0 kV. An active reference power required to be transmitted by a hybrid MMC is set to 0 mW, and a reactive reference power required to be transmitted to an AC system is set to 1 mVAR according to requirements for stability of the connected AC system and DC lines. The AC voltage reference $e_{iv\_ref}$ required to be output for each phase of the MMC during ride-through of the DC short circuit fault is obtained. $u_{if\_p}$, $u_{ih\_p}$, $u_{if\_n}$, and $u_{ih\_n}$ are calculated and expressed by the following equations:

$$u_{if\_p}=-e_{iv\_ref}(1-\tfrac{1}{2}m)+U_{dc}\tfrac{1}{4}m,$$

$$u_{ih\_p}=-e_{iv\_ref}\tfrac{1}{2}m+U_{dc}\tfrac{1}{4}m,$$

$$u_{if\_n}=e_{iv\_ref}(1-\tfrac{1}{2}m)+U_{dc}\tfrac{1}{4}m, \text{ and}$$

$$u_{ih\_n}=e_{iv\_ref}\tfrac{1}{2}m+U_{dc}\tfrac{1}{4}m;$$

Switching signal for each of the sub-modules is obtained by combining with a present voltage of each of the sub-modules. The DC voltage is detected to be restored to a rated value. The active power reference and the reactive power reference for the hybrid MMC are set to values in normal operation, that is, the transmitted active power equals 10 mW and the reactive power equals 1 mVAR. $u_{if\_p}$, $u_{ih\_p}$, $u_{if\_n}$, and $u_{ih\_n}$ are recalculated.

Figure 4:
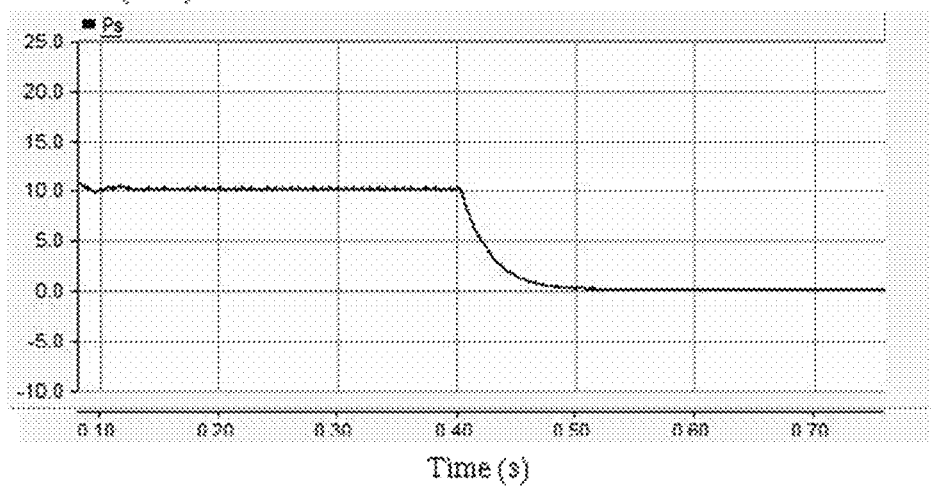
FIG. 4 illustrates a simulation diagram of a curve between active power transmitted by a converter and time in fault ride-through according to Example 1 of the invention.
Figure 5:
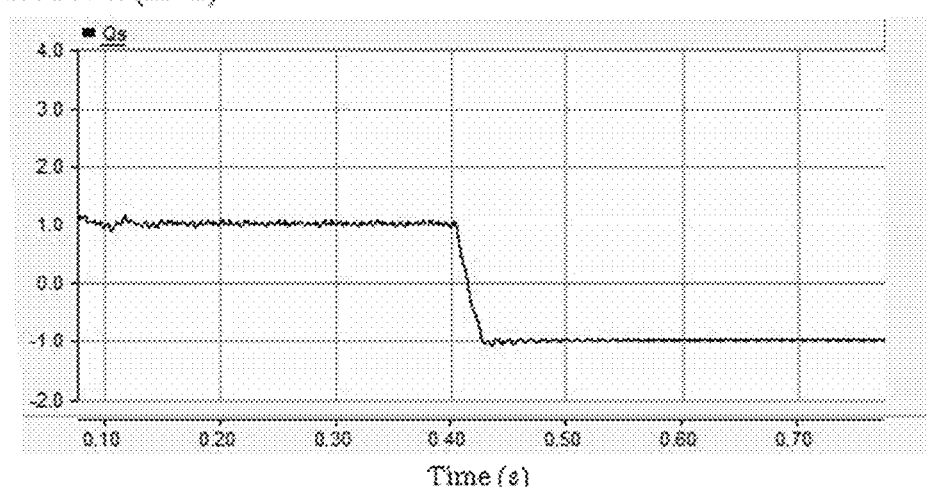
FIG. 5 is a simulation diagram of a curve between reactive power transmitted by the converter and time in fault ride-through according to Example 1 of the invention.
Figure 6:
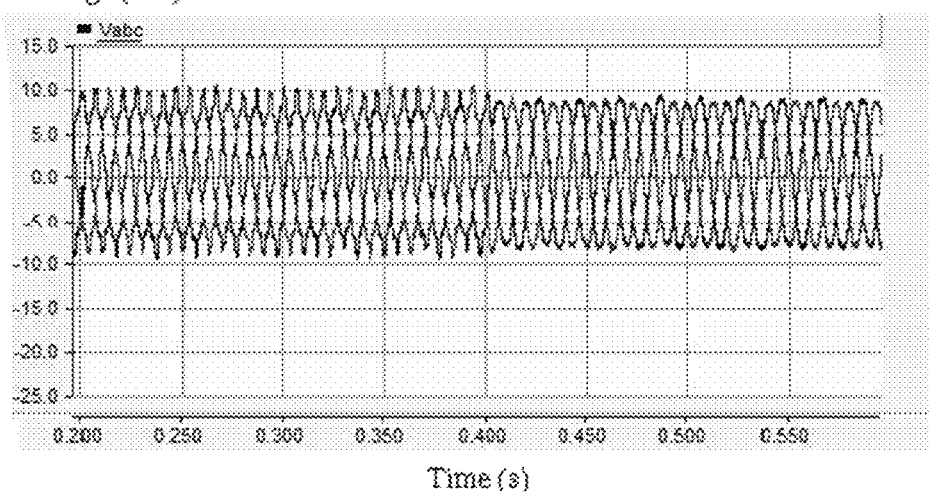
FIG. 6 illustrates a simulation diagram of curves between 3 phase voltages on an AC side of the converter and time in fault ride-through according to Example 1 of the invention.

When a DC fault occurs, a relation between the active power transmitted by the converter and a time is illustrated in FIG. 4, which illustrates the converter is able to control transmission of the active power in failure. A relation between the reactive power transmitted by the converter and the time is illustrated in FIG. 5, which illustrates the converter is able to provide reactive power support for a grid in failure. Relations between 3 phase voltages on an AC side of the converter and the time are illustrated in FIG. 6, which shows the converter is able to isolate the DC fault and keep an AC voltage stable without blocking in failure.

Figure 7:
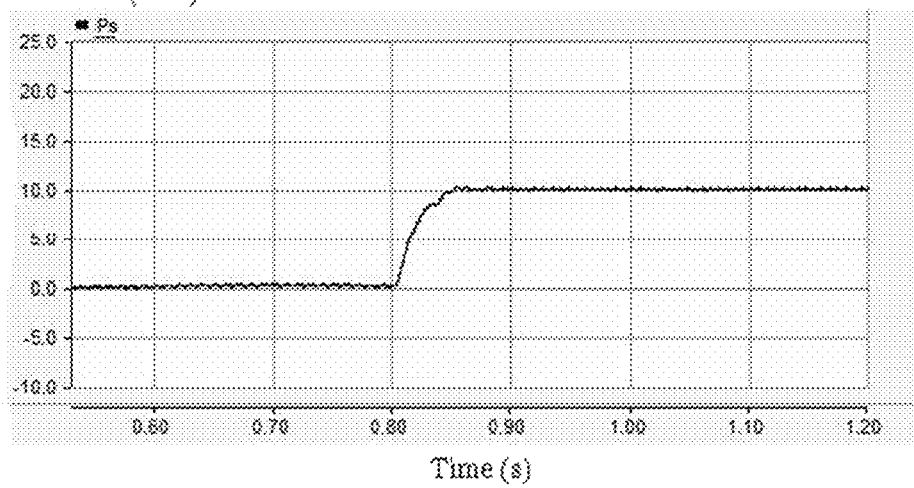
FIG. 7 illustrates a simulation diagram of a curve between active power transmitted by the converter and time in fault recovery according to the Example 1 of the invention.
Figure 8:
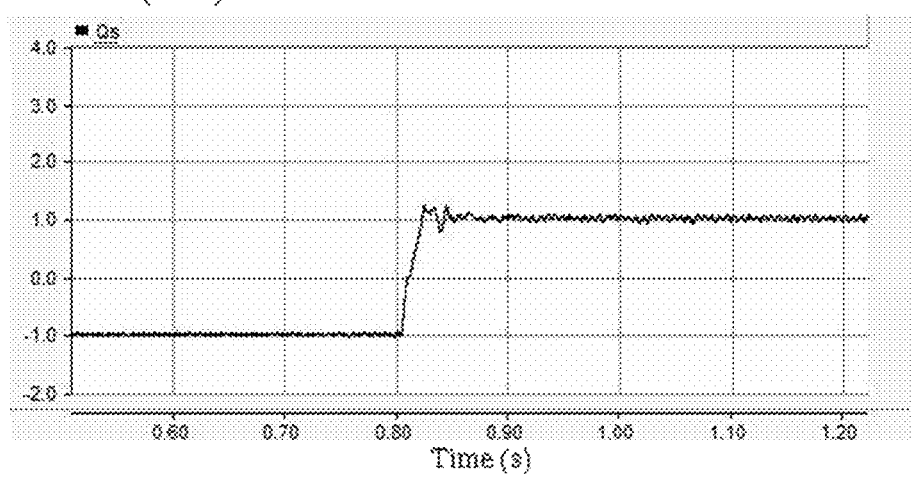
FIG. 8 is a simulation diagram of a curve between reactive power transmitted by the converter and time in fault recovery according to the Example 1 of the invention.
Figure 9:
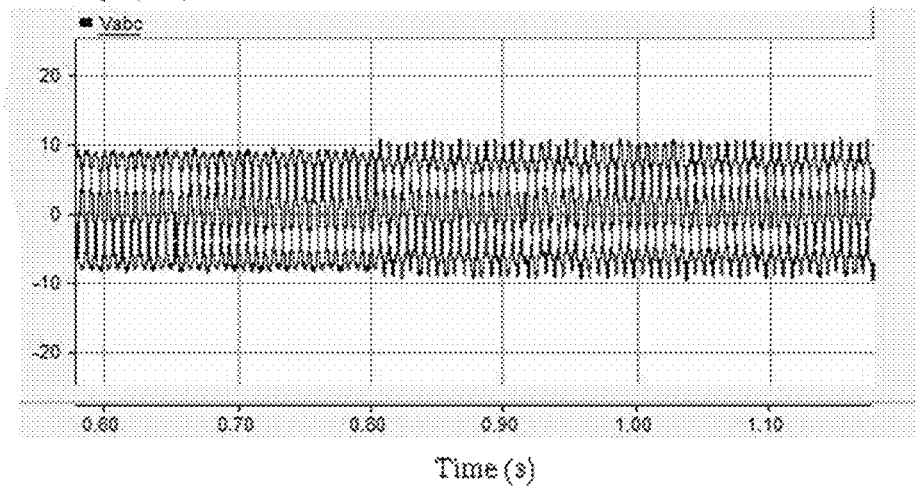
FIG. 9 is a simulation diagram of curves between 3 phase voltages on an AC side of the converter and time in fault recovery according to the Example 1 of the invention.

During fault recovery, a relation between the active power transmitted by the converter and the time is illustrated in FIG. 7, which illustrates the converter is able to resume the active power transmission rapidly without being restarted. A relation between the reactive power transmitted by the converter and the time is illustrated in FIG. 8, which illustrates the converter is able to resume the reactive power transmission rapidly without being restarted. Relations between 3 phase voltages on the AC side of the converter and the time are illustrated in FIG. 9, which shows the converter is able to keep the AC voltage stable during fault recovery.

Example 2

A DC short circuit fault is detected and a DC voltage becomes 0 kV. An active reference power required to be transmitted by a hybrid MMC is set to 0 mW, and a reactive reference power required to be transmitted to an AC system is set to 1 mVAR according to requirements for stability of the connected AC system and DC lines. The AC voltage reference $e_{iv\_ref}$ required to be output for each phase of the MMC during ride-through of the DC short circuit fault is obtained. $u_{if\_p}$, $u_{ih\_p}$, $u_{if\_n}$, and $u_{ih\_n}$ are calculated and expressed by the following equations:

$$u_{if\_p}=-\tfrac{1}{2}e_{iv\_ref}-\tfrac{1}{4}U_{dc}+\tfrac{1}{2}mU_{dc},$$

$$u_{ih\_p}=-\tfrac{1}{2}e_{iv\_ref}+\tfrac{1}{4}U_{dc},$$

$$u_{if\_n}=\tfrac{1}{2}e_{iv\_ref}-\tfrac{1}{4}U_{dc}+\tfrac{1}{2}mU_{dc}, \text{ and}$$

$$u_{ih\_n}=\tfrac{1}{2}e_{iv\_ref}+\tfrac{1}{4}U_{dc};$$

Switching signal for each of the sub-modules is obtained by combining with a present voltage of each of the sub-modules. The DC voltage is detected to be restored to a rated value. The active power reference and the reactive power reference for the hybrid MMC are set to values in normal operation, in which the transmitted active power equals 10 mW and the reactive power equals 1 mVAR. $u_{if\_p}$, $u_{ih\_p}$, $u_{if\_n}$, and $u_{ih\_n}$ are recalculated.

Figure 10:
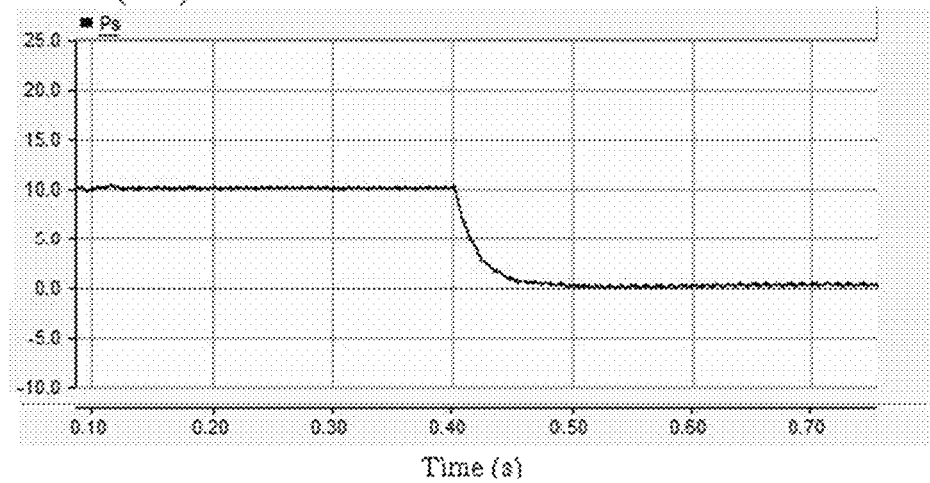
FIG. 10 illustrates a simulation diagram of a curve between active power transmitted by a converter and time in fault ride-through according to Example 2 of the invention.
Figure 11:
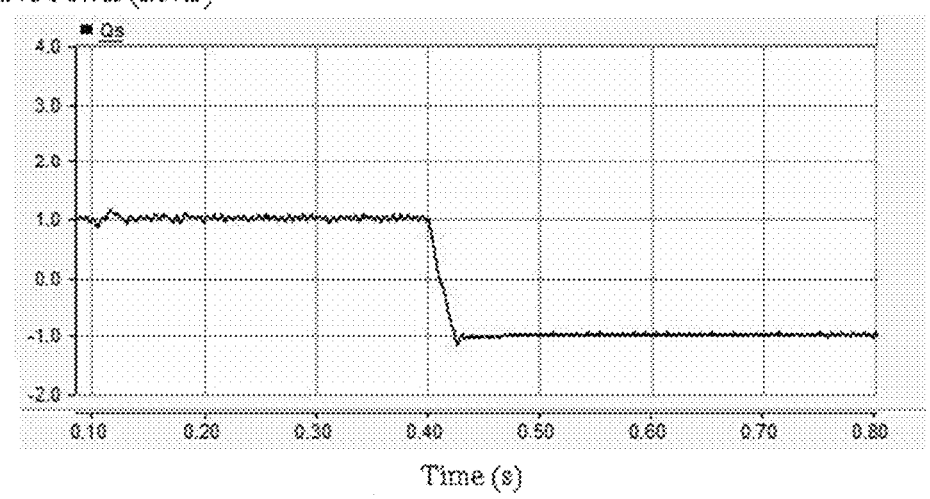
FIG. 11 is a simulation diagram of a curve between reactive power transmitted by the converter and time in fault ride-through according to Example 2 of the invention.
Figure 12:
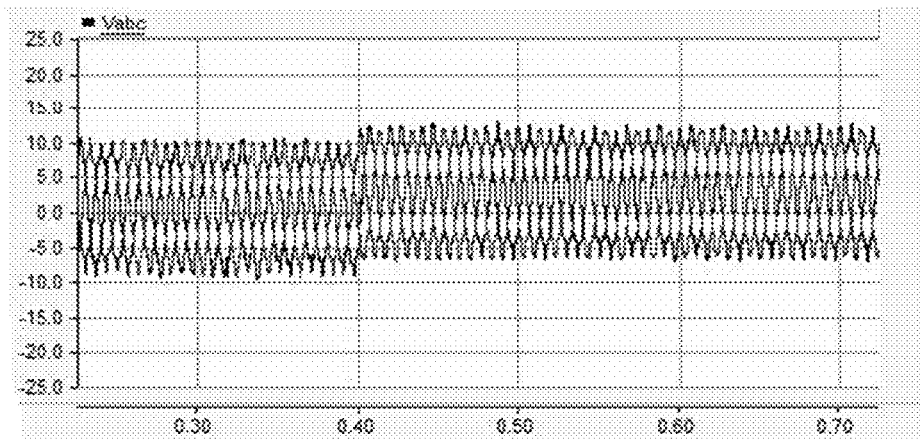
FIG. 12 illustrates a simulation diagram of curves between 3 phase voltages on an AC side of the converter and time in fault ride-through according to Example 2 of the invention.

When a DC fault occurs, a relation between active power transmitted by the converter and time is illustrated in FIG. 10, which illustrates the converter is able to control transmission of active power in failure. A relation between the reactive power transmitted by the converter and time is illustrated in FIG. 11, which illustrates the converter is able to provide reactive power support for a grid in failure. Relations between 3 phase voltages on an AC side of the converter and time are illustrated in FIG. 12, which show the converter is able to isolate the DC fault and keep an AC voltage stable without blocking in failure.

Figure 13:
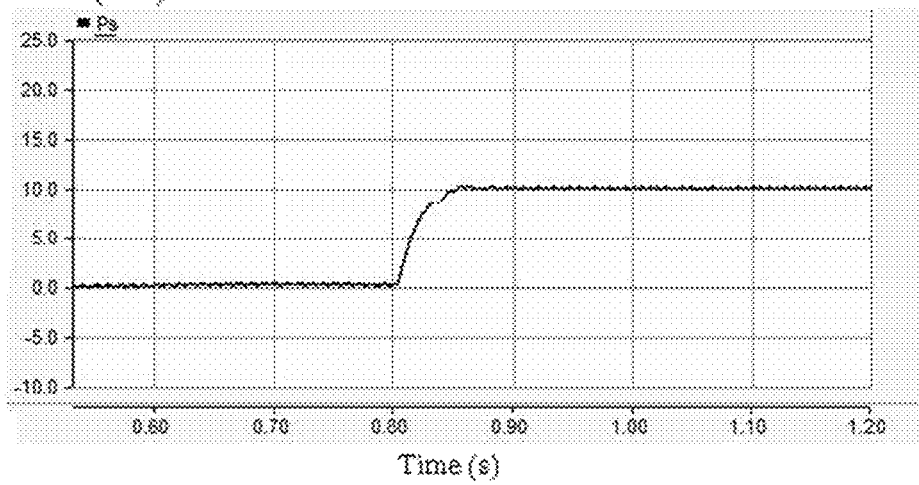
FIG. 13 illustrates a simulation diagram of a curve between active power transmitted by the converter and time in fault recovery according to Example 2 of the invention.
Figure 14:
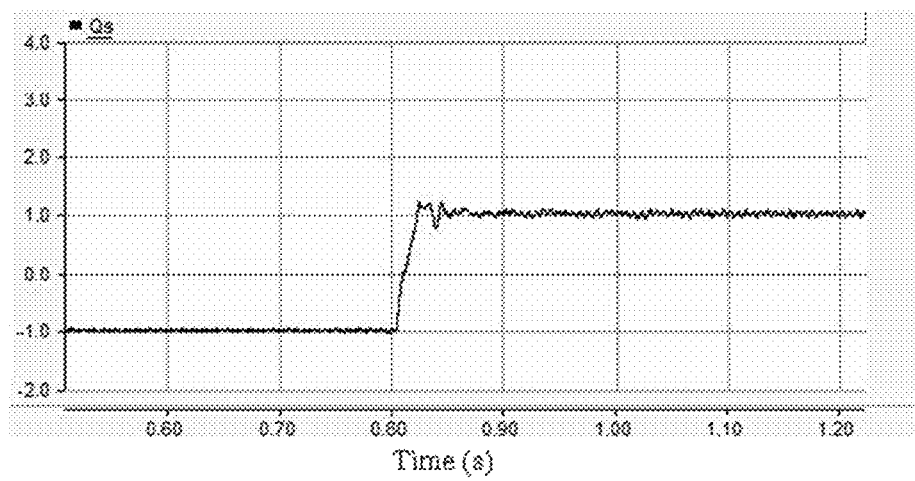
FIG. 14 is a simulation diagram of a curve between reactive power transmitted by the converter and time in fault recovery according to the Example 2 of the invention.
Figure 15:
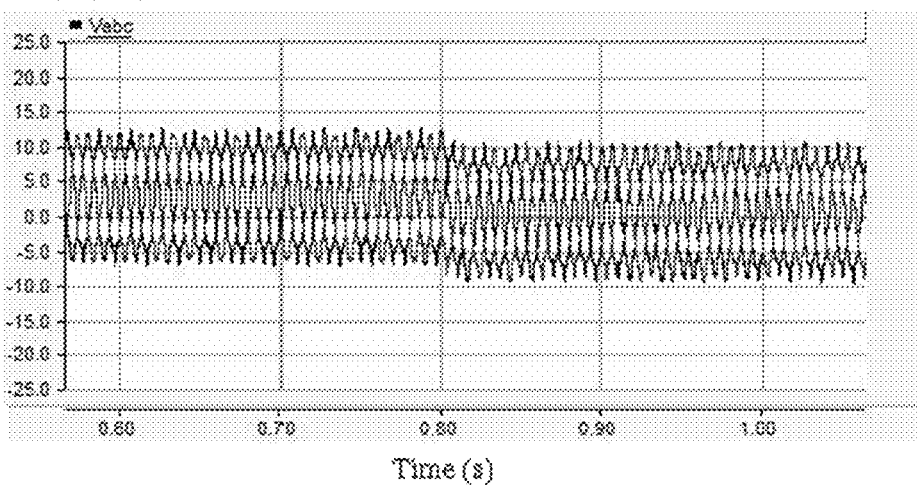
FIG. 15 is a simulation diagram of curves between 3 phase voltages on an AC side of the converter and time in fault recovery according to the Example 2 of the invention.

During fault recovery, a relation between active power transmitted by the converter and time is illustrated in FIG. 13, which illustrates the converter is able to resume active power transmission rapidly without being restarted. A relation between the reactive power transmitted by the converter and time is illustrated in FIG. 14, which illustrates the converter is able to resume reactive power transmission rapidly without being restarted. Relations between 3 phase voltages on the AC side of the converter and time are illustrated in FIG. 15, which show the converter is able to keep the AC voltage stable during fault recovery.

Example 3

A DC short circuit fault is detected and a DC voltage becomes 0 kV. An active reference power required to be transmitted by a hybrid MMC is set to 0 mW, and a reactive reference power required to be transmitted to an AC system is set to 1 mVAR according to requirements for stability of the connected AC system and DC lines. The AC voltage reference $e_{iv\_ref}$ required to be output for each phase of the MMC during ride-through of the DC short circuit fault is obtained. $u_{if\_p}$, $u_{ih\_p}$, $u_{if\_n}$, and $u_{ih\_n}$ are calculated and expressed by the following equations:

$$u_{if\_p} = -e_{iv\_ref}\left(1 - x - \frac{1}{2}m + xm\right) + U_{dc}\left(\frac{1}{4}m + \frac{xm}{2} - \frac{x}{2}\right),$$

$$u_{ih\_p} = -e_{iv\_ref}\left(x + \frac{1}{2}m - xm\right) + U_{dc}\left(\frac{1}{4}m - \frac{xm}{2} + \frac{x}{2}\right),$$

$$u_{if\_n} = e_{iv\_ref}\left(1 - x - \frac{1}{2}m + xm\right) + U_{dc}\left(\frac{1}{4}m + \frac{xm}{2} - \frac{x}{2}\right),$$

and $$u_{ih\_n} = e_{iv\_ref}\left(x + \frac{1}{2}m - xm\right) + U_{dc}\left(\frac{1}{4}m - \frac{xm}{2} + \frac{x}{2}\right);$$

where x=0.2. Switching signal for each of the sub-modules is obtained by combining with a present voltage of each of the sub-modules. The DC voltage is detected to be restored to a rated value. The active power reference and the reactive power reference for the hybrid MMC are set to values in normal operation, in which the transmitted active power equals 10 mW and the reactive power equals 1 mVAR. $u_{if\_p}$, $u_{ih\_p}$, $u_{if\_n}$, and $u_{ih\_n}$ are recalculated.

Figure 16:
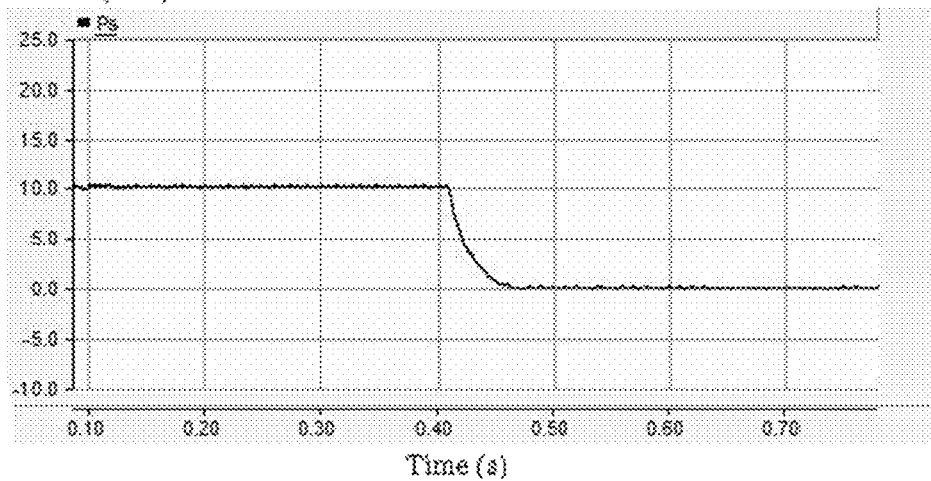
FIG. 16 illustrates a simulation diagram of a curve between active power transmitted by a converter and time in fault ride-through according to Example 3 of the invention.
Figure 17:
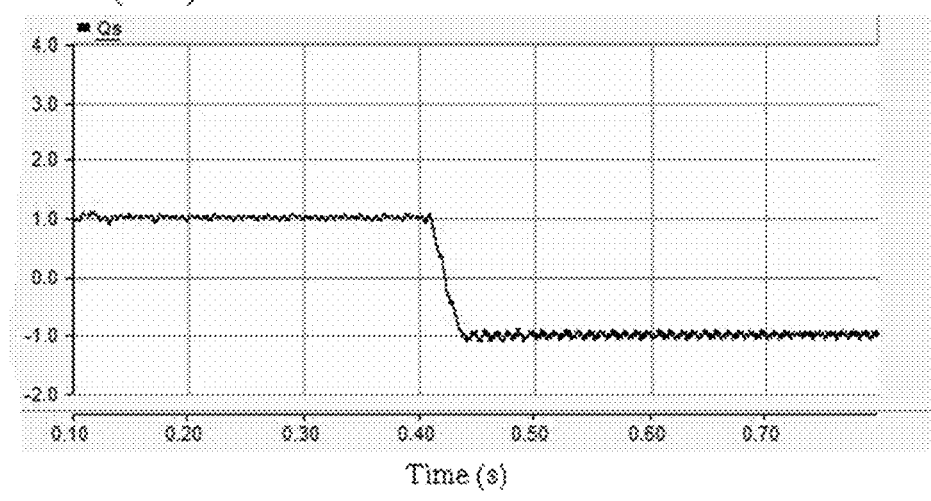
FIG. 17 is a simulation diagram of a curve between reactive power transmitted by the converter and time in fault ride-through according to Example 3 of the invention.
Figure 18:
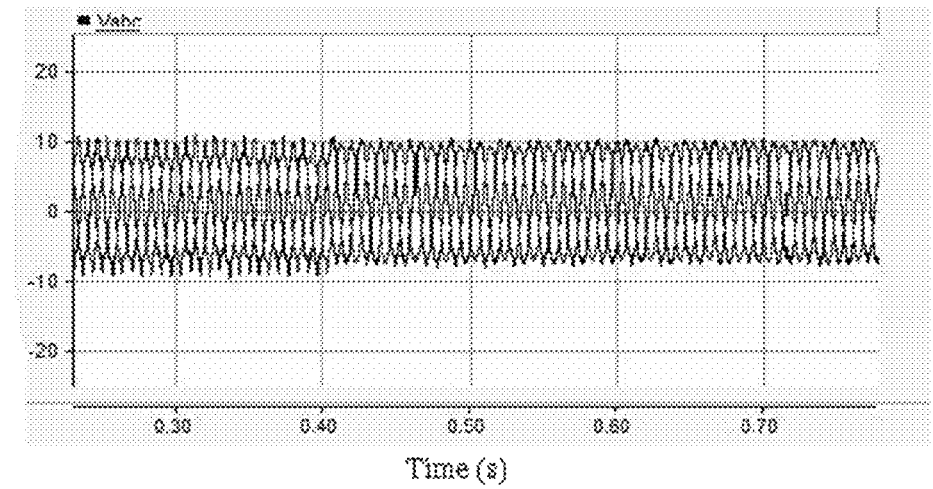
FIG. 18 illustrates a simulation diagram of curves between 3 phase voltages on an AC side of the converter and time in fault ride-through according to Example 3 of the invention.

When a DC fault occurs, a relation between active power transmitted by the converter and time is illustrated in FIG. 16, which illustrates the converter is able to control transmission of active power during failure. A relation between the reactive power transmitted by the converter and time is illustrated in FIG. 17, which illustrates the converter is able to provide reactive power support for a grid in failure. Relations between 3 phase voltages on an AC side of the converter and time are illustrated in FIG. 18, which shows the converter is able to isolate the DC fault and keep an AC voltage stable without blocking during failure.

Figure 19:
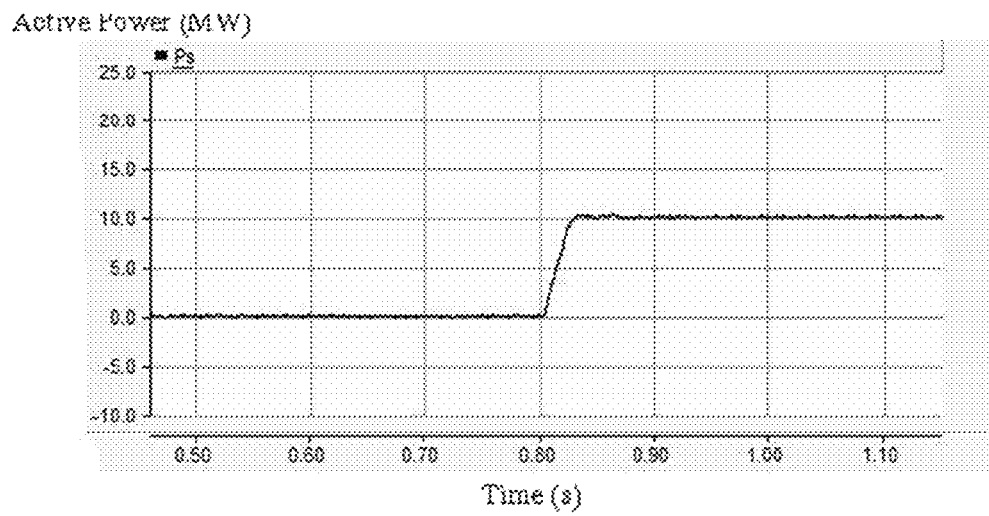
FIG. 19 illustrates a simulation diagram of a curve between active power transmitted by the converter and time in fault recovery according to Example 3 of the invention.
Figure 20:
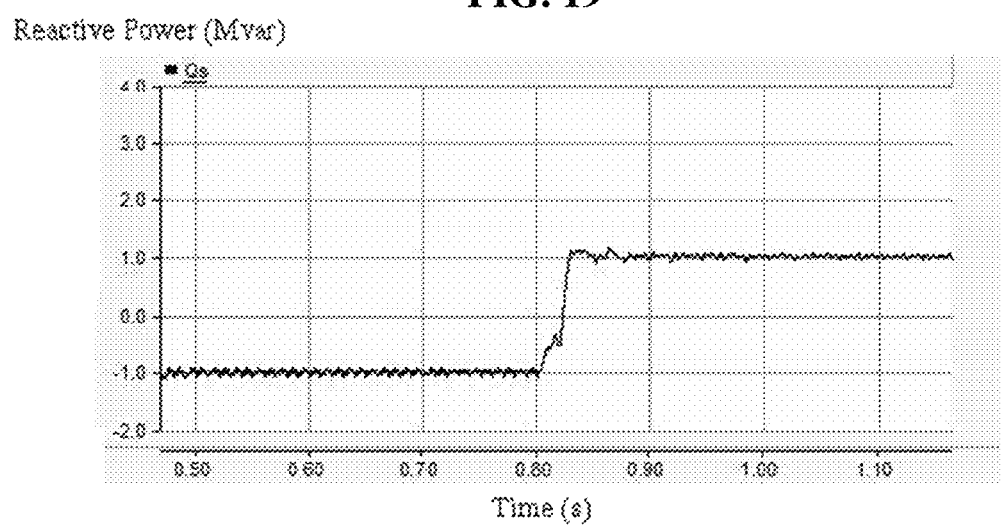
FIG. 20 is a simulation diagram of a curve between reactive power transmitted by the converter and time in fault recovery according to the Example 3 of the invention.
Figure 21:
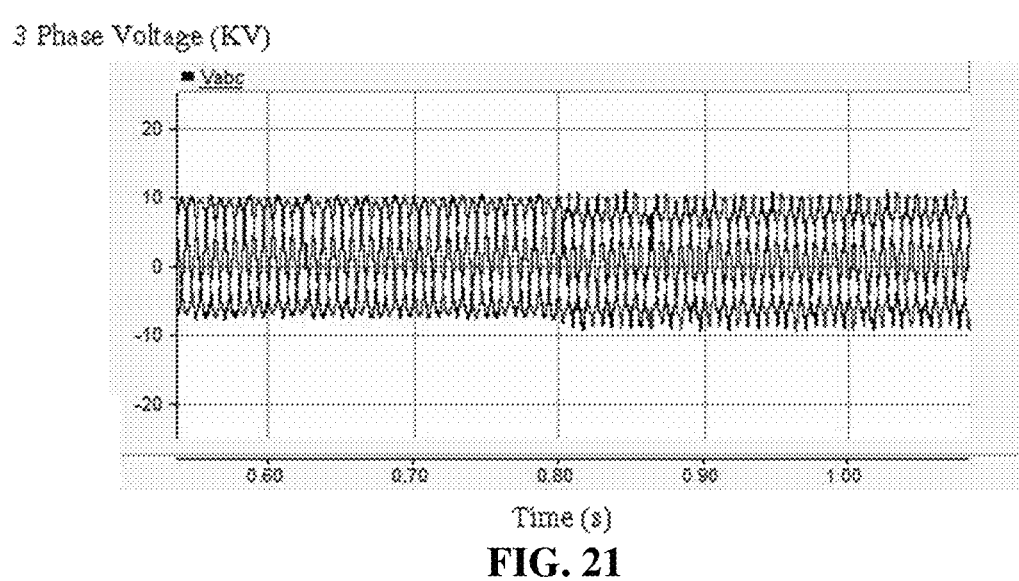
FIG. 21 is a simulation diagram of curves between 3 phase voltages on an AC side of the converter and time in fault recovery according to the Example 3 of the invention.

During fault recovery, a relation between active power transmitted by the converter and time is illustrated in FIG. 19, which illustrates the converter is able to resume active power transmission rapidly without being restarted. A relation between the reactive power transmitted by the converter and time is illustrated in FIG. 20, which illustrates the converter is able to resume reactive power transmission rapidly without being restarted. Relations between 3 phase voltages on the AC side of the converter and time are illustrated in FIG. 21, which show the converter is able to keep the AC voltage stable during fault recovery period.

Example 4

A DC short circuit fault is detected and a DC voltage becomes 0 kV. An active power reference required to be transmitted by a hybrid MMC is set to 0 mW, and a reactive power reference required to be transmitted to an AC system is set to 1 mVAR according to requirements for stability of the connected AC system and DC lines. The AC voltage reference $e_{iv\_ref}$ required to be output for each phase of the MMC during ride-through of the DC short circuit fault is obtained. When $e_{iv\_ref} \geq 0$, $u_{if\_p}$, $u_{ih\_p}$, $u_{if\_n}$, and $u_{ih\_n}$ are calculated and expressed by the following equations:

$$u_{if\_p} = -e_{iv\_ref} + \tfrac{1}{2}me_{iv\_ref} + \tfrac{1}{4}mU_{dc},$$

$$u_{ih\_p} = -\tfrac{1}{2}me_{iv\_ref} + \tfrac{1}{4}mU_{dc},$$

$$u_{if\_n} = \tfrac{1}{2}me_{iv\_ref} + \tfrac{1}{4}mU_{dc}, \text{ and}$$

$$u_{ih\_n} = e_{iv\_ref} - \tfrac{1}{2}me_{iv\_ref} + \tfrac{1}{4}mU_{dc};$$

when $e_{iv\_ref} < 0$, $u_{if\_p}$, $u_{ih\_p}$, $u_{if\_n}$, and $u_{ih\_n}$ are expressed by the following equations:

$$u_{if\_p} = -\tfrac{1}{2}me_{iv\_ref} + \tfrac{1}{4}mU_{dc},$$

$$u_{ih\_p} = -e_{iv\_ref} + \tfrac{1}{2}me_{iv\_ref} + \tfrac{1}{4}mU_{dc},$$

$$u_{if\_n} = e_{iv\_ref} - \tfrac{1}{2}me_{iv\_ref} + \tfrac{1}{4}mU_{dc}, \text{ and}$$

$$u_{ih\_n} = \tfrac{1}{2}me_{iv\_ref} + \tfrac{1}{4}mU_{dc};$$

Switching signal for each of the sub-modules is obtained by combining with a present voltage of each of the sub-modules. The DC voltage is detected to be restored to a rated value. The active power reference and the reactive power reference for the hybrid MMC are set to values in normal operation, in which the transmitted active power equals 10 mW and the reactive power equals 1 mVAR. $u_{if\_p}$, $u_{ih\_p}$, $u_{ih\_n}$, and $u_{if\_n}$ are recalculated.

Figure 22:
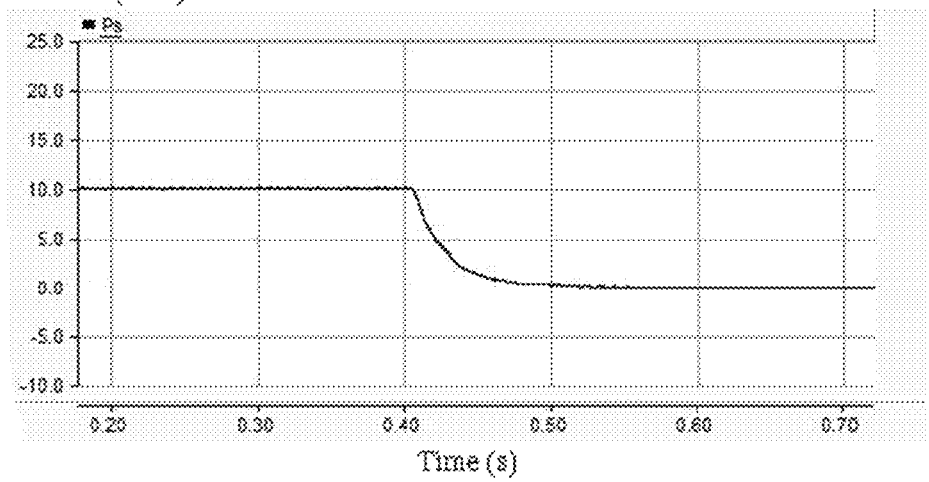
FIG. 22 illustrates a simulation diagram of a curve between active power transmitted by a converter and time in fault ride-through according to Example 4 of the invention.
Figure 23:
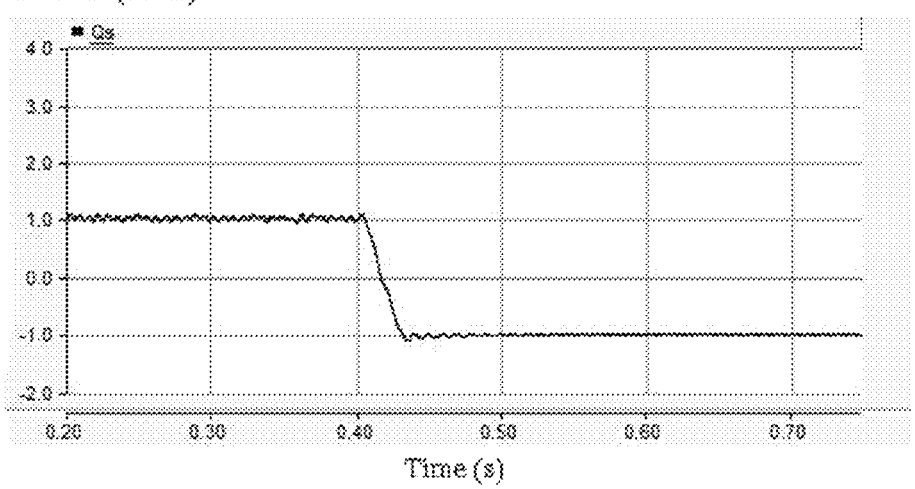
FIG. 23 is a simulation diagram of a curve between reactive power transmitted by the converter and time in fault ride-through according to Example 4 of the invention.
Figure 24:
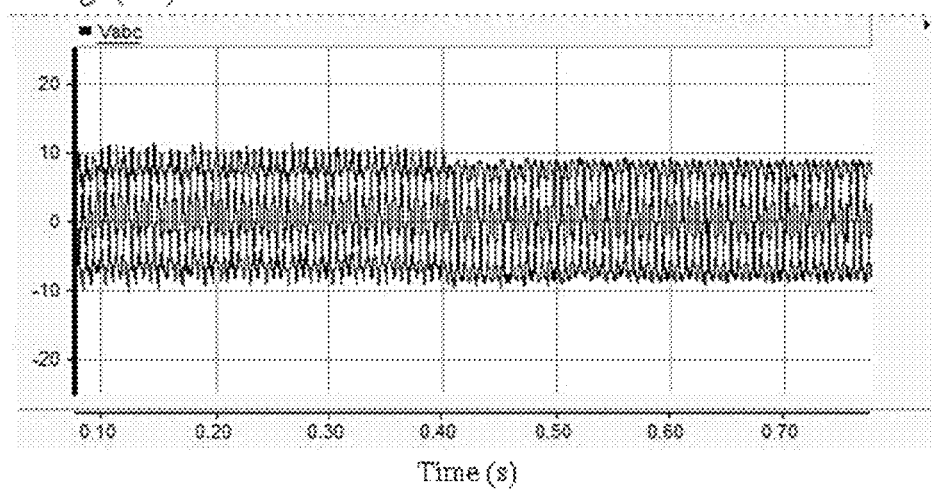
FIG. 24 illustrates a simulation diagram of curves between 3 phase voltages on an AC side of the converter and time in fault ride-through according to Example 4 of the invention.

When a DC fault occurs, a relation between active power transmitted by the converter and time is illustrated in FIG. 22, which illustrates the converter is able to control transmission of active power during failure. A relation between the reactive power transmitted by the converter and time is illustrated in FIG. 23, which illustrates the converter is able to provide reactive power support for a grid in failure. Relations between 3 phase voltages on an AC side of the converter and time are illustrated in FIG. 24, which show the converter is able to isolate the DC fault and keep an AC voltage stable without blocking in failure.

Figure 25:
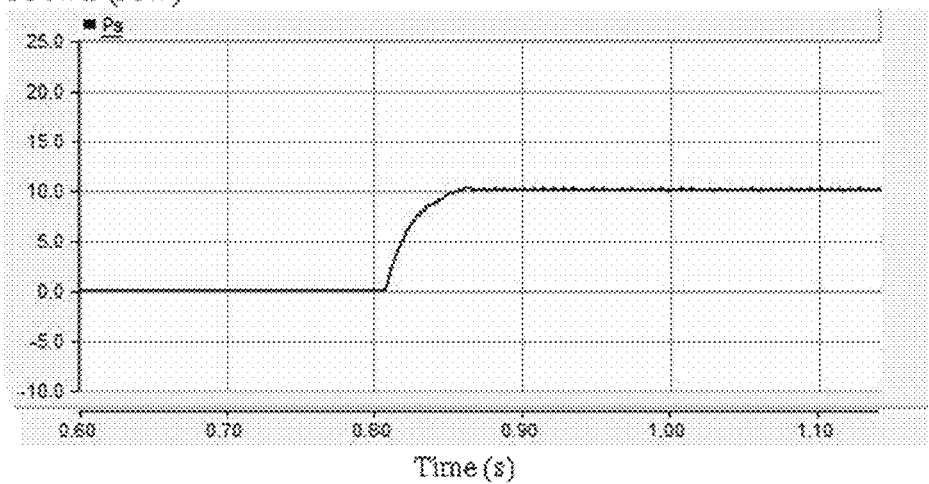
FIG. 25 illustrates a simulation diagram of a curve between active power transmitted by the converter and time in fault recovery according to Example 4 of the invention.
Figure 26:
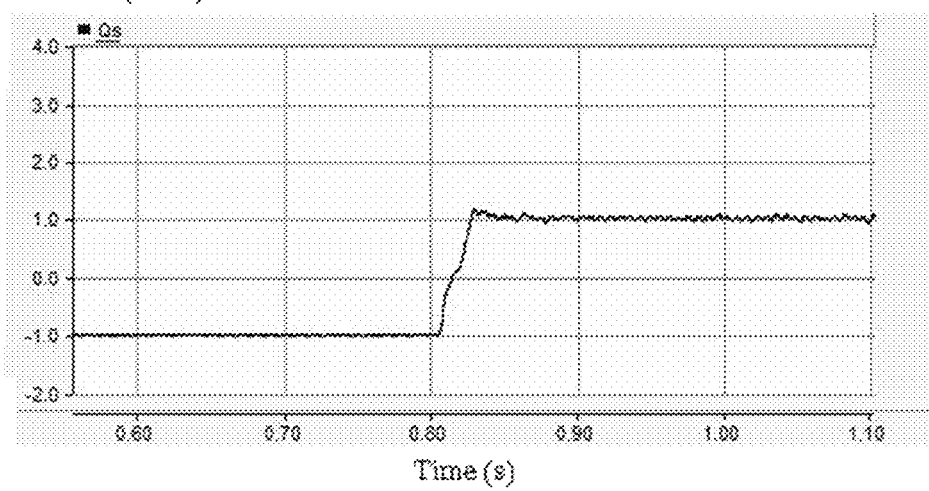
FIG. 26 is a simulation diagram of a curve between reactive power transmitted by the converter and time in fault recovery according to the Example 4 of the invention.
Figure 27:
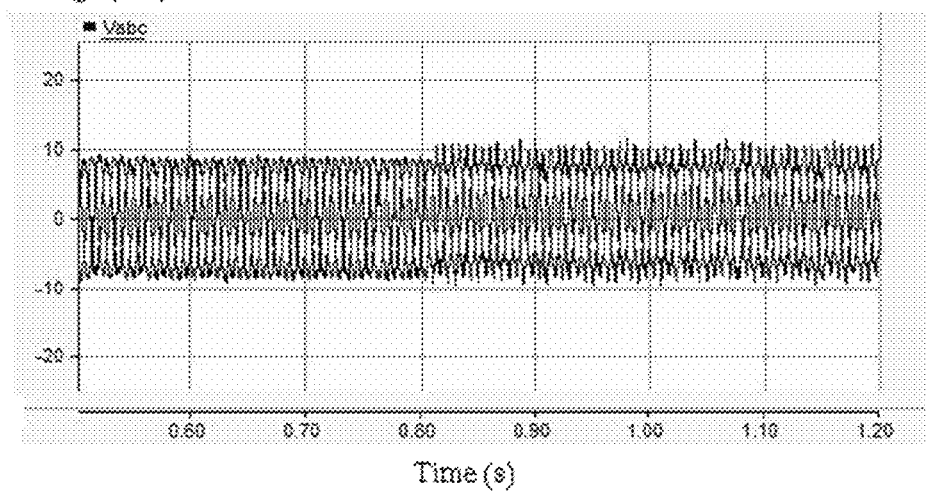
FIG. 27 is a simulation diagram of curves between 3 phase voltages on an AC side of the converter and time in fault recovery according to the Example 4 of the invention.

During fault recovery, a relation between active power transmitted by the converter and time is illustrated in FIG. 25, which illustrates the converter is able to resume active power transmission rapidly without being restarted. A relation between the reactive power transmitted by the converter and time is illustrated in FIG. 26, which illustrates the converter is able to resume reactive power transmission rapidly without being restarted. Relations between 3 phase voltages on the AC side of the converter and time are illustrated in FIG. 27, which show the converter is able to keep the AC voltage stable during fault recovery.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of riding through and recovering from a short circuit fault of a DC side of a high-voltage direct current transmission (HVDC) system, the HVDC system comprising a grid, multiple DC lines, and a hybrid modular multi-level converter (hybrid MMC); the hybrid MMC comprising multiple phases; each phase comprising an upper arm and a lower arm; each of the upper arm and the lower arm comprising a full-bridge sub-module and a half-bridge sub-module; the method comprising:
   1) detecting whether the short circuit fault of the DC side of the HVDC system occurs by using the hybrid MMC, and proceeding to 2) if yes and continuing detecting if no;
   2) sequentially performing step A) and step B) by using the hybrid MMC to ride through the short circuit fault of the DC side;
   3) detecting whether a residual voltage of the DC side increases by using the hybrid MMC, and proceeding to 4) if yes and continuing detecting if no; and 4) sequentially performing step A) and step B) by using the hybrid MMC to recover from the short circuit fault of the DC side;

wherein:

step A) comprises: detecting the residual voltage of the DC side, a three phase AC voltage of the HVDC system, and a three phase AC current of the HVDC system; setting a reactive power required to be injected to the grid by the hybrid MMC during failure of the HVDC system and an active power required to be transmitted by the DC lines; and obtaining an AC voltage reference $e_{iv\_ref}$ required to be output from the each phase of the hybrid MMC according to the reactive power, the active power, the residual voltage of the DC side, the three phase AC voltage of the HVDC system, and the three phase AC current of the HVDC system; and step B) comprises: calculating a first voltage reference $u_{if\_p}$ of an equivalent voltage source of the full-bridge sub-module of the upper arm of the each phase, a second voltage reference $u_{ih\_p}$ of an equivalent voltage source of the half-bridge sub-module of the upper arm of the each phase, a third voltage reference $u_{if\_n}$ of an equivalent voltage source of the full-bridge sub-module of the lower arm of the each phase, and a fourth voltage reference $u_{ih\_n}$ of an equivalent voltage source of the half-bridge sub-module of the lower arm of the each phase according to the AC voltage reference $e_{iv\_ref}$, a rated voltage $U_{dc}$ of the DC side, and a ratio m between the residual voltage of the DC side and the rated voltage $U_{dc}$; obtaining a switching signal of each of the full-bridge sub-module and the half-bridge sub-module according to a present voltage of the each of the full-bridge sub-module and the half-bridge sub-module, the first voltage reference $u_{if\_p}$, the second voltage reference $u_{ih\_p}$, the third voltage reference $u_{if\_n}$, and the fourth voltage reference $u_{ih\_n}$, wherein i represents the each phase; and sending the switching signal of the each of the full-bridge sub-module and the half-bridge sub-module to the HVDC system for outputting the AC voltage reference $e_{iv\_ref}$ to the HVDC system.

2. The method of claim 1, wherein
in step B), $u_{if\_p}$, $u_{ih\_p}$, $u_{if\_n}$, and $u_{ih\_n}$ are calculated according to the following equations:

$u_{if\_p} = -e_{iv\_ref}(1-\frac{1}{2}m) + U_{dc}\frac{1}{4}m$, $u_{ih\_p} = -e_{iv\_ref}\frac{1}{2}m + U_{dc}\frac{1}{4}m$, $u_{if\_n} = e_{iv\_ref}(1-\frac{1}{2}m) + U_{dc}\frac{1}{4}m$, and $u_{ih\_n} = e_{iv\_ref}\frac{1}{2}m + U_{dc}\frac{1}{4}m$.

3. The method of claim 1, wherein
in step B), $u_{if\_p}$, $u_{ih\_p}$, $u_{if\_n}$, and $u_{ih\_n}$ are calculated according to the following equations:

$u_{if\_p} = -\frac{1}{2}e_{iv\_ref} - \frac{1}{4}U_{dc} + \frac{1}{2}mU_{dc}$, $u_{ih\_p} = -\frac{1}{2}e_{iv\_ref} + \frac{1}{4}U_{dc}$, $u_{if\_n} = \frac{1}{2}e_{iv\_ref} - \frac{1}{4}U_{dc} + \frac{1}{2}mU_{dc}$, and $u_{ih\_n} = \frac{1}{2}e_{iv\_ref} + \frac{1}{4}U_{dc}$.

4. The method of claim 1, wherein
in step B), $u_{if\_p}$, $u_{ih\_p}$, $u_{if\_n}$, and $u_{ih\_n}$ are calculated according to the following equations:

$u_{if\_p} = -e_{iv\_ref}\left(1 - x - \frac{1}{2}m + xm\right) + U_{dc}\left(\frac{1}{4}m + \frac{xm}{2} - \frac{x}{2}\right)$, $u_{ih\_p} = -e_{iv\_ref}\left(x + \frac{1}{2}m - xm\right) + U_{dc}\left(\frac{1}{4}m - \frac{xm}{2} + \frac{x}{2}\right)$, $u_{if\_n} = e_{iv\_ref}\left(1 - x - \frac{1}{2}m + xm\right) + U_{dc}\left(\frac{1}{4}m + \frac{xm}{2} - \frac{x}{2}\right)$, and $u_{ih\_n} = e_{iv\_ref}\left(x + \frac{1}{2}m - xm\right) + U_{dc}\left(\frac{1}{4}m - \frac{xm}{2} + \frac{x}{2}\right)$, wherein x is a constant in the range of 0-0.5 voltage.

5. The method of claim 1, wherein
in step B), when $e_{iv\_ref} \geq 0$, $u_{if\_p}$, $u_{ih\_p}$, $u_{if\_n}$, and $u_{ih\_n}$ are calculated according to the following equations:

$u_{if\_p} = -e_{iv\_ref} + \frac{1}{2}me_{iv\_ref} + \frac{1}{4}mU_{dc}$, $u_{ih\_p} = -\frac{1}{2}me_{iv\_ref} + \frac{1}{4}U_{dc}$, $u_{if\_n} = \frac{1}{2}me_{iv\_ref} + \frac{1}{4}mU_{dc}$, and $u_{ih\_n} = e_{iv\_ref} - \frac{1}{2}me_{iv\_ref} + \frac{1}{4}mU_{dc}$, and when $e_{iv\_ref} < 0$, $u_{if\_p}$, $u_{ih\_p}$, $u_{if\_n}$, and $u_{ih\_n}$ are calculated according to the following equations:

$u_{if\_p} = -e_{iv\_ref} + \frac{1}{2}me_{iv\_ref} + \frac{1}{4}mU_{dc}$, $u_{ih\_p} = -e_{iv\_ref} + \frac{1}{2}me_{iv\_ref} + \frac{1}{4}mU_{dc}$, $u_{if\_n} = e_{iv\_ref} - \frac{1}{2}me_{iv\_ref} + \frac{1}{4}mU_{dc}$, and $u_{ih\_n} = \frac{1}{2}me_{iv\_ref} + \frac{1}{4}mU_{dc}$.

* * * * *